(12) United States Patent
Holloway

(10) Patent No.: US 8,273,800 B2
(45) Date of Patent: Sep. 25, 2012

(54) SELF-PRIMING SURFACING COMPOSITION FOR FINISHED SURFACES

(76) Inventor: Larry Allen Holloway, Trussville, AL (US)

( * ) Notice: Subject to any disclaimer, the term of this patent is extended or adjusted under 35 U.S.C. 154(b) by 1021 days.

(21) Appl. No.: 12/239,587

(22) Filed: Sep. 26, 2008

(65) Prior Publication Data

US 2009/0242118 A1    Oct. 1, 2009

Related U.S. Application Data

(60) Provisional application No. 61/072,114, filed on Mar. 28, 2008.

(51) Int. Cl.
*C08J 11/04* (2006.01)
(52) U.S. Cl. ........... 521/40; 427/140; 521/40.5; 521/48
(58) Field of Classification Search ........... 521/40–49.8; 427/140
See application file for complete search history.

(56) References Cited

U.S. PATENT DOCUMENTS

| | | | |
|---|---|---|---|
| 3,736,277 A | 5/1973 | Bender | |
| 3,895,018 A | 7/1975 | Adolf | |
| 4,042,539 A | 8/1977 | Fanning | |
| 5,160,628 A | 11/1992 | Gerace | |
| 5,254,263 A | 10/1993 | Gerace | |
| 5,489,333 A | 2/1996 | Soroushian | |
| 5,547,504 A | 8/1996 | Soroushian | |
| 5,765,293 A | 6/1998 | St. Louis | |
| 5,880,218 A | 3/1999 | Gerace | |
| 5,922,834 A | 7/1999 | Gerace | |
| 6,455,598 B1 * | 9/2002 | Gerace et al. | 521/41 |
| 7,128,780 B2 | 10/2006 | Matheson et al. | |
| 2003/0084824 A1 | 5/2003 | Matheson | |
| 2006/0287414 A1 | 12/2006 | Knight | |

OTHER PUBLICATIONS

International Bureau of WIPO, International Preliminary Report on Patentability, PCT/US2009/040758, Sep. 28, 2010.

\* cited by examiner

*Primary Examiner* — Edward Cain
(74) *Attorney, Agent, or Firm* — Jeffrey Dyess; Nicholas J. Landau; Bradley Arant Boult Cummings LLP

(57) ABSTRACT

A surfacing composition made of recycled paint, which requires no priming, has a non-reflective "flat" appearance, and is partially composed of dried paint. The composition provides a useful application for used or excess household paint, which would otherwise require special methods of disposal and potentially create future toxic cleanup problems. The composition is made of granular dried paint and a water-based sealer, which can be spread on a surface to repair imperfections. The surface can then be finished, and no priming is required. Due to the composition's flat appearance, the patch does not display any characteristic sheen where the repair has been made. The composition provides a simple means of recycling paint, and provides a simple and inexpensive means of repairing imperfections in walls and other surfaces while saving the step of priming the patch before painting or repainting.

30 Claims, No Drawings

SELF-PRIMING SURFACING COMPOSITION FOR FINISHED SURFACES

This application cites for priority U.S. provisional Application No. 61/072,114 filed on Mar. 28, 2008, which is incorporated by reference in its entirety.

FIELD OF THE DISCLOSURE

The present disclosure is directed to the field of patching compositions, jointing compositions surfacing composition, and plastering compositions for surfaces. The present disclosure is also directed to methods of making surfacing compositions of the above description, and to methods of their use.

BACKGROUND

Surfaces, including, but not limited to, finished surfaces and surfaces to be finished, commonly contain imperfections. In many cases, the surface is a painted surface (such as but not limited to a wall) or the surface is an unfinished surface that is to be painted. For example, a wall in a residential structure may contain nicks, holes or other imperfections as a result of daily activities and decorating. The foregoing nicks, holes or other imperfections are desirably repaired to maintain aesthetic qualities. In addition, when preparing buildings, drywall and other materials are joined together by jointing compositions and imperfections in the drywall surface are smoothed using such compositions. Such imperfections are sometimes merely superficial, but may pose a hazard to the integrity of the material if a protective layer of paint or other finish is breached.

Conventionally, such imperfections are filled using a patching composition, jointing composition, surfacing composition, or plastering composition (generally referred to herein as a surfacing composition), depending on the size and nature of the imperfection. The surfacing composition is applied to the imperfection, allowed to dry, and then finished as needed. When a repair is being made, the finish is applied so as to match the original surface as closely as possible. The surfacing compositions is generally further prepared, such as by sanding and priming, before the finish is applied.

However, traditional surfacing compositions have certain drawbacks. Most surfacing compositions dry to a state that does not exactly match the original surface. As a result, when finished, the repaired surface does not match the original finished surface, revealing that the area has been repaired. For example, when surfacing compositions are applied to a painted surface, the repaired surface often has a shiny or glossy appearance. This sheen can only be eliminated through additional labor, but elimination of the sheen is not always possible with some surfacing compositions. The repaired area would be more aesthetically pleasing if the surface of the patch were "flat" in appearance so as to match the original surface. In addition, when surfacing compositions are used in construction to prepare unfinished surfaces, the area to which the surfacing composition is applied may be visible after the finish is applied. Furthermore, surfacing compositions are generally primed prior to painting, or the result will be inferior adhesion between the paint and the repair, leading to blistering, flashing, and other problems. Time and labor would be saved if no priming were necessary.

Paint itself poses a major disposal problem. Household paints are considered hazardous waste. Disposal of used and unneeded paint is expensive, and is typically achieved through deposition of the paint in a landfill. Deposition in a landfill creates the possibility that the waste paint will escape into the surrounding area, causing environmental harm. In addition, the possibility that the waste paint will not be adequately contained creates potential civil and criminal liability should environmental cleanup be required.

The proposed restrictions on the sale of alkyd paint in the United States may result in large quantities of unwanted alkyd paint requiring disposal in the near future. Alkyd paints are oil-based paints in which the diluent or thinner is typically (but not always) a mineral spirit and in which the binder is an alkyd resin. Mineral spirits are volatile organic compounds (VOC). Once alkyd paint is applied to a surface, the mineral spirit evaporates, contributing significantly to VOC pollution. Proposed regulations would limit the use of alkyd paints formulated with VOC, and this will create a need for economical and safe methods of recycling these paints.

For the reasons described above, superior surfacing compositions are needed that allow the repair of a finished surface and the finishing of an unfinished surface such that the visibility of the surfacing composition is reduced as compared to prior art surfacing compositions or eliminated. In addition, superior methods of recycling and reuse are needed for both alkyd paints and other types of paints.

DETAILED DESCRIPTION

The disclosure provides a novel surfacing composition and methods for using such a surfacing composition in repairing a finished surface, repairing an unfinished surface, and preparing an unfinished surface. For example, the surfacing compound may by used to plaster a surface, join/joint intersecting surfaces, and repair imperfections in a surface. In one embodiment, the surface is a painted wall. However, other finished surfaces are within the scope of the present disclosure. In one embodiment, the unfinished surface is one or more sections of drywall; however, other unfinished surfaces are within the scope of the present disclosure.

The description here illustrates and describes the methods, compositions, and other teachings of the present disclosure. The disclosure shows and describes only certain embodiments of the methods, compositions, and other teachings disclosed, but, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described are further intended to explain certain best modes known of practicing the methods, compositions, and other teachings of the present disclosure and to enable others skilled in the art to utilize the teachings of the present disclosure in such, or other, embodiments and with the various modifications required by the particular applications or uses. Accordingly, the methods, compositions and other teachings of the present disclosure are not intended to limit the exact embodiments and examples disclosed herein.

I. OBJECTS OF THE COMPOSITIONS AND METHODS

It is an object of some embodiments of the compositions and methods to solve the problem of the difficulty of disposing of unneeded or used paint by incorporating the paint into a useful surfacing composition that does not require immediate disposal.

It is an object of some embodiments of the compositions and methods to provide surfacing compositions for repairing a finished surface and preparing an unfinished surface.

It is an object of some embodiments of the compositions and methods to eliminate or reduce (as compared to prior art surfacing compositions) the presence of distinguishing characteristics (such as but not limited to a sheen) that are apparent when a surfacing composition has been applied to a surface, including both finished and unfinished surfaces.

It is an object of some embodiments of the compositions and methods to provide a surfacing composition wherein a repaired surface displays no or reduced distinguishing characteristics (as compared to other surfacing compositions) indicating where composition has been applied or an unfinished surface displays no or reduced distinguishing characteristics (as compared to other surfacing compositions) indicating where the composition has been applied after the unfinished surface has been finished.

It is an object of some embodiments of the compositions and methods to solve the problem of the labor required to repair a finished surface and prepare an unfinished surface by providing a surfacing composition that requires no priming before being repaired or finished.

Other objects are served and problems in the art are solved by embodiments of the methods and compositions of this disclosure, as is understood by those skilled in the art.

II. DEFINITIONS

"Alkyd" as used herein means the class of binders formed by the condensation of polyhydric alcohols with polybasic acids.

"Alkyd paint" as used herein means an oil-based paint in which the binder is an alkyd.

"Fanning" as used herein means to direct a current of air upon a target.

"Finished Surface" as used herein means any surface that has been finished. Finishing can include painting, lacquering, shellacking, sealing, and the like.

"Granular" as used herein means in the form of relatively small grains or particles.

"Including" as used herein is non-exclusive, and can be read to mean "including but not limited to."

"Plastering" as used herein means to apply a composition as a coating or incrustation, and does not exclusively refer to the application of plaster.

"Repair" as used herein means to restore the surface to an even contour matching the areas around the repair.

"Sealer" as used herein means a finishing material, either clear or pigmented, that is usually applied directly over a surface for the purpose of sealing the surface.

"Unfinished surface" as used herein means a surface that would normally be finished after construction, preparation or repair, or a surface that one intends to finish after construction, preparation or repair, regardless of whether the surface is actually finished. Finishing can include painting, lacquering, shellacking, sealing, and the like.

Terms used in the singular should be construed as including the plural, and vice-versa.

III. SURFACING COMPOSITIONS

The disclosure provides surfacing compositions for repairing a finished surface and preparing an unfinished surface. Such surfacing compositions are useful for jointing and patching imperfections in surfaces. Various embodiments of the surfacing compositions disclosed herein have various advantages over previously known surfacing compositions. Various embodiments of the surfacing compositions have at least one of the following advantages: they dry rapidly after application to a surface; they do not require priming prior to painting; they can be applied to a wide variety of surfaces; they display good adhesion properties; they present a surface without observable characteristics (such as but not limited to a sheen) that identify the location of the composition; and they provide a means for recycling waste paint.

The surfacing composition of the present disclosure comprises dried paint. In certain embodiments, the dried paint may be granular in nature. The granular dried paint can be obtained from any source. The granular dried paint can be obtained from a previously painted surface. In some embodiments of the surfacing composition, the granular dried paint is obtained by removing paint from a previously painted surface and grinding the paint to generate a granular product. In certain of these embodiments impurities are removed from the dried paint prior to combining the dried paint with the sealer. In certain of these embodiments the granular dried paint is further dried after removal from the previously painted surface by any of the drying methods described herein.

In some embodiments of the surfacing composition, the granular dried paint can be obtained by drying and grinding a liquid paint. The liquid paint can be from any source, including overspray, paint purchased in excess of that needed for a job, paint manufactured in excess of orders, and paint that has been stored for a period of time exceeding its acceptable shelf-life. The paint can be an acrylic (water-based) paint or an oil-based paint, including an alkyd paint. Alkyd paints have the advantages of drying quickly and grinding well. The paint can be dried by any appropriate method known by those skilled in the art, including heating, low pressure, or fanning (alone or in combination). In some embodiments of the surfacing composition, the liquid paint is dried by exposure to air at ambient temperature. In embodiments of the surfacing composition, the liquid paint is dried by fanning the paint. Fanning can be achieved using any appropriate fan or blower, including even a typical hand-held hair drier for small batches. Larger fans and blowers can be used as well. The paint may be heated during fanning. Heat may be transferred to the paint by conduction (for example, heating the vessel containing the paint), convection (for example, heating the air around the paint, as in an oven), or radiation. Heat may be transferred to the paint by heating the air with which the paint is fanned, for example by using a heated blower. If fanning is used, air must be fanned over the paint at a sufficient rate to facilitate drying.

Drying may be achieved by heating alone, or by heating in combination with fanning as explained above. When heat is used to achieve drying, the paint may be subjected to any temperature above the paint's freezing point at the pressure under which heating occurs. If heating occurs in the presence of diatomic oxygen (or another strong oxidant), then the paint may be dried at a temperature below its flash point. Alkyd paint, for example, typically has a flash point of about 100° F. (200° F. surface temperature with air movement). As a result, in embodiments of the surfacing composition in which a liquid alkyd paint is dried, drying should occur at temperatures below about 100° F. In some embodiments of the surfacing composition, drying is conducted at sub-atmospheric concentrations of diatomic oxygen. In certain of these embodiments, alkyd paint may be dried at a temperature at or above about 100° F. The safe flashpoint of the particular alkyd paint under a particular concentration of diatomic oxygen can be determined by one skilled in the art without undue experimentation.

In general, acrylic paint has a higher flash point than does alkyd paint. Accordingly, in some embodiments of the surfacing composition comprising acrylic paint, drying can be conducted at higher temperatures. Various embodiments of the surfacing composition employ drying temperatures of about 100-750° F., about 200-600° F., about 250-500° F. and about 500°

The temperature may be varied during a given batch. Employing reduced pressure or fanning at a given temperature will achieve faster drying.

Oxygen may be reduced or excluded from the air around the paint during drying. The pressure may be varied to achieve drying, alone or in combination with heating or fanning. Pressures below one atmosphere will speed drying at a given temperature. Reduced air pressure also has the effect of reducing the effective oxygen concentration, which will increase the flash point of the paint. Various embodiments of the surfacing composition achieve drying at all, some, or none of the following pressures: vacuum, 0.95 atmosphere (atm), 0.9 atm, 0.8 atm, 0.75 atm, 0.7 atm, 0.6 atm, 0.5 atm, 0.4 atm, 0.3 atm, 0.25 atm, 0.2 atm, 0.15 atm, and 0.1 atm.

The dried paint may be ground by any appropriate method known by those skilled in the art. For example, the dried paint may be ground by any of the following: a rotary mill, a ball mill, a rod mill, a mortar and pestle, a SAG mill, a pebble mill, an autogenous mill, a Buhrstone mill, grinding rolls, a colloid mill, a disk mill, an edge mill, a hammer mill, and a Wiley mill. For small batches, dried paint may be ground in a household food processor, or a kitchen blender.

In some embodiments of the surfacing composition, the granular dried paint is combined with the sealer after drying without further processing. In some embodiments, the granular dried paint is segregated based on particle diameter prior to combining with the sealer. The granulated dried paint may be segregated by any means known in the art to ensure consistency of the grain size. In some embodiments of the surfacing composition, segregation is performed to produce a granular dried paint with a consistency approximating that of flour. For example, in some embodiments, the paint is first sifted with a 180 sieve; the retained fraction ("retentate") of the #80 sieve is further sifted through either of a #20 sieve or a #25 sieve. The fraction that passes through the #20 or #25 sieve ("siftate") is combined with a sealer as described herein. In some embodiments, the granular dried paint is sifted such that about 90% of the granular dried paint has a diameter up to about 2.0 mm. In some embodiments, the diameter is about 0.18-2.0 mm. In some embodiments, the diameter is about 0.17-0.70 mm. In some embodiments, segregation is achieved using a household flour sifter. Finer granular dried paint has the advantage of being more easily spread in the surfacing composition.

The granular dried paint is combined with a sealer. In various embodiments of the surfacing composition, the ratio of granular dried paint to sealer is at least one of the following: 40-80%, 50-70%, 55-65%, 60%, and about these values. For example, one embodiment of the composition is the product of mixing 24 volumetric ounces of granular dried paint with 16 fluid ounces of sealer (a volume:volume ratio of 60%).

The paint and the sealer may be combined by any method known in the art. Such methods of combining include blending, shaking, mixing, stirring, and admixing. Combining may be performed with any appropriate equipment, depending on the scale of the batch to be prepared. Appropriate equipment includes, for example, a commercial paint blender (such as the CEI FlowMaster sold by ColorEng Inc. of Hudson, N.H.), a drill-mounted paint blender (such as those sold by Vermont American Tools, of Lincolnton, N.C.), a table-top shaker (such as the Blair 51000, sold by Blair Equipment Company of Flint, Mich.), a commercial kitchen arm mixer, and a household mixer.

Embodiments of the surfacing composition may comprise any sealer. The sealer may be water-based, oil-based, or alkyd-based. In some embodiments of the surfacing composition, the sealer comprises a water-based acrylic sealer. In certain of these embodiments, the sealer further comprises a styrene-acrylic resin. The sealer may or may not further comprise a pigment, including (but not limited to) titanium dioxide or extender pigments. In various embodiments of the surfacing composition the sealer may comprises at least one of the following: texanol (CAS number 25265-77-4), styrene copolymer (CAS number 25750-06-5), styrene acrylic copolymer (CAS number 25085-34-1), and formaldehyde. In various embodiments of the surfacing composition, the sealer may comprise at least one of the following: limestone, titanium dioxide, and quartz.

The surfacing composition may also be provided in the form of a kit for repairing an imperfection in a surface to be finished, a kit for jointing two intersecting surfaces, or a kit for plastering a surface.

IV. METHODS OF REPAIRING, JOINTING, AND PLASTERING A SURFACE

The disclosure provides methods of repairing a finished surface using any of the surfacing compositions disclosed herein. The repair may correct any damage to the surface, including, but not limited to, hammer dings, nail holes, tack holes, screw holes, fissures, cracks, indentations, excisions, and the like. The surface may be a finished surface or an unfinished surface.

The disclosure provides methods of preparing an unfinished surface, using any of the surfacing compositions disclosed herein.

In the foregoing, the presence of distinguishing characteristics (such as but not limited to a sheen) that are apparent when a surfacing composition has been applied to a surface, including both finished and unfinished surfaces, is eliminated or reduced (as compared to prior surfacing compositions).

Through the methods described herein, at least one of the following advantages is obtained: the surfacing composition dries rapidly after application to a surface; the surfacing composition does not require priming prior to painting; the surfacing composition can be applied to a wide variety of surfaces; the surfacing composition displays good adhesion properties; the surfacing composition presents a surface without observable characteristics (such as but not limited to a sheen) that identify the location of the composition; and the surfacing composition provides a means for recycling waste paint.

The surface may be virtually any type of construction. In some embodiments of the surfacing composition, the surface is any of the following: drywall, metal, metal frame, plaster, concrete, cement board, stucco, stone, artificial stone, fiber cement, vinyl, PVC, wood, wood composite, aluminum composite, brick, adobe, cannabrick, cast earth, cast stone, cob, earthen plaster, glass, tile, asphalt, terra cotta, and ceramic.

Some embodiments of the method comprise applying a surfacing composition comprising a sealer and a granular dried paint over a repaired area, the repaired area comprising an imperfection; allowing the composition to dry; and finishing the repaired area. In certain of these embodiments the repaired area is not primed prior to finishing. The surfacing composition may be any embodiment of the surfacing composition taught in this disclosure. The surfacing composition may be applied by any means known in the art, for example by spreading the surfacing composition with a putty knife (also known as a Spackle knife). One coat of surfacing composition may be sufficient. In some embodiments of the method, two or more coats of surfacing composition are applied. Some embodiments of the method further comprise sanding the composition once dry and prior to painting, although this is not always necessary. Some embodiments of the method comprise texturing the repaired area, using spray texture or other means.

The disclosure provides methods for jointing two intersecting surfaces to be finished, using any of the surfacing compositions disclosed herein. The intersecting surfaces may be finished or unfinished. Some embodiments of the method comprise jointing the intersecting surfaces with the surfacing composition; allowing the composition to dry; and finishing at least a portion of one surface. In some embodiments of the method the surfacing composition is used in the same manner as a conventional jointing composition. In each case, the surfaces may be finished or unfinished.

The disclosure further provides methods for plastering a surface to be finished, using any of the surfacing compositions disclosed herein. Some embodiments of the method comprise plastering the surfacing composition over the surface; allowing the composition to dry; and finishing the surface. In each case the surfacing composition is used in the same manner as a conventional plastering composition, as is understood by those skilled in the art. In each case, the surfaces may be finished or unfinished.

V. EXAMPLES

Production of Small Batches of Surfacing Composition

The following non-limiting examples merely illustrate certain embodiments of the compositions and methods described in this disclosure. These examples illustrate the production of small batches of the surfacing composition using household equipment. The processes may be scaled up to produce larger quantities as would be understood by those skilled in the art.

A. Example 1

In this example, the dried granular paint was acrylic paint. Liquid acrylic paint was obtained unused from the can, and poured into a 18"×24" baking pan. The pan was placed in a preheated oven at 500° F. for 8 minutes. After this time the paint was dry. The dried paint was then ground in a food processor. The granular dried paint was then further ground in a blender until it achieved the consistency of flour. The floury granular dried paint was then combined with sealer at a ratio of 16 volumetric ounces of sealer to 24 volumetric ounces of paint. The sealer was ICI Paints Prep & Prime Bond Prep interior/exterior water-based pigmented masonry bonding primer sealer (Imperial Chemical Industries, Ltd., Berkshire, England).

The surfacing composition was applied to a hammer ding in a drywall surface. The composition was spread over the area comprising the hammer ding with a putty knife and allowed to dry. The repaired area was painted without priming. The resultant repair showed no characteristic sheen from the repair, did not re-wet when exposed to moisture, and took paint without flashing, providing a high-quality patch.

B. Example 2

In this example the granular dried paint was an alkyd paint. Liquid alkyd paint was obtained unused from the can, and poured into a 18"×24" baking pan. The paint was dried using a household hair drier, with the heating element deactivated. After the paint was dried, the dried paint was ground in a food processor. The granular dried paint was then further ground in a blender until it achieved the consistency of flour. The floury granular dried paint was then combined with sealer at a ratio of 24 volumetric ounces of paint to 16 volumetric ounces of sealer. The sealer was ICI Paints Prep & Prime Bond Prep interior/exterior water-based pigmented masonry bonding primer sealer (Imperial Chemical Industries, Ltd., Berkshire, England).

In each instance, the surfacing composition was applied to an imperfection in a drywall surface. The composition was spread over the area comprising the imperfection with a putty knife and allowed to dry. The repaired area was painted without priming. The resultant repair showed no characteristic sheen from the repair, did not re-wet when exposed to moisture, and took paint without flashing, providing a high-quality patch.

I claim:

1. A surfacing composition for repairing a finished surface or preparing an unfinished surface, the composition comprising a sealer and a granular dried paint.

2. The surfacing composition of claim 1, wherein the granular dried paint is a product of a process comprising:
   a. obtaining a dried paint; and
   b. grinding the dried paint to form a granular dried paint.

3. The surfacing composition of claim 2, wherein obtaining a dried paint further comprises
   a. obtaining a liquid paint; and
   b. drying the liquid paint to form the dried paint.

4. The surfacing composition of claim 3, wherein the liquid paint is dried by: (a) subjecting the liquid paint to an increased temperature, (b) fanning the liquid paint, (c) subjecting the liquid paint to a low pressure, (a) and (b), (a) and (c), (b) and (c), or (a), (b) and (c).

5. The surfacing composition of claim 4, wherein the increased temperature is at least one of the following: up to about 100° F., about 100-750° F., about 200-600° F., about 250-500° F., and about 500° F.

6. The surfacing composition of claim 4, wherein drying the liquid paint further comprises:
   a. subjecting the liquid paint to an increased temperature up to about 100° F.;
   b. fanning the liquid paint; and
   c. subjecting the liquid paint to low pressure.

7. The surfacing composition of claim 1, wherein the granular dried paint is selected from the group consisting of: acrylic paint and alkyd paint.

8. The surfacing composition of claim 1, wherein the sealer comprises a water-based acrylic sealer.

9. The surfacing composition of claim 1, wherein the surfacing composition consists essentially of the sealer and the granular dried paint.

10. The surfacing composition of claim 8, wherein the sealer further comprises a styrene-acrylic resin.

11. The surfacing composition of claim 10, the sealer further comprising a pigment.

12. The surfacing composition of claim 1, wherein the ratio of granular dried paint to sealer is selected from the group consisting of: about 40-80%, about 50-70%, about 55-65%, and about 60%.

13. The surfacing composition of claim 1, wherein about 90% of the granular dried paint has a diameter selected from the group consisting of: about 2.0 mm, about 0.18-2.0 mm, and about 0.17-0.7 mm.

14. The surfacing composition of claim 8, the sealer further comprising texanol.

15. The surfacing composition of claim 8, the sealer further comprising styrene copolymer.

16. The surfacing composition of claim 8, the sealer further comprising an ingredient selected from the group consisting of: limestone, titanium oxide, quartz, and formaldehyde.

17. A surfacing composition for repairing a surface to be finished, the composition comprising a sealer and a granular dried paint,
   a. the sealer comprising by weight about 20-30% limestone, about 5-10% titanium oxide, about 0.1-1.0% quartz, about 1-5% texanol, about 5-10% styrene copolymer, about 0.01-0.10% formaldehyde, about 40-50% water, and about 5-10% styrene acrylic copolymer;
   b. the granular dried paint comprising a product of a process selected from the group consisting of:
      i. obtaining a liquid acrylic paint, subjecting the paint to an elevated temperature of about 500° F. to form a dried paint, and grinding the dried paint to form the granular dried paint; and
      ii. obtaining a liquid alkyl paint, fanning the paint, forming a dried paint, and grinding the dried paint to form the granular dried paint;
   wherein the surfacing composition comprises about 25% sealer by volume.

18. A method of repairing a surface to be finished, the method comprising
   a. applying the surfacing composition of claim 17 over a repaired area;
   b. allowing the composition to dry; and
   c. finishing the repaired area;
wherein the repaired area is not primed prior to painting the repaired area.

19. A method of repairing a surface to be finished, the method comprising
   a. applying the surfacing composition of claim 1 over a repaired area;
   b. allowing the composition to dry; and
   c. finishing the repaired area.

20. The method of claim 19, wherein the repaired area is not primed after applying and prior to finishing.

21. The method of claim 19, wherein the surface is selected from the group consisting of: drywall, metal, metal frame, plaster, concrete, cement board, stucco, stone, artificial stone, fiber cement, vinyl, PVC, wood, wood composite, aluminum composite, brick, adobe, cannabrick, cast earth, cast stone, cob, earthen plaster, glass, tile, asphalt, terra cotta, and ceramic.

22. A method of plastering a surface to be finished, the method comprising
   a. plastering the surfacing composition of claim 1 over the surface;
   b. allowing the composition to dry; and
   c. finishing the surface.

23. A method of jointing two intersecting surfaces, the method comprising
   a. jointing the intersecting surfaces with the surfacing composition of claim 1;
   b. allowing the composition to dry; and
   c. finishing at least a portion of one surface.

24. A method for filling or covering a gap in a surface, the method comprising
   a. applying the surfacing composition of claim 1 over a gapped portion of the surface;
   b. allowing the composition to dry; and
   c. finishing the gapped portion of the surface.

25. A kit comprising the surfacing composition of claim 1.

26. The kit of claim 25, wherein the kit is for at least one of: repairing a surface to be painted, plastering a surface to be painted, and jointing two intersecting surfaces.

27. The method of claim 19, wherein a repaired surface displays an eliminated or reduced distinguishing characteristic indicating where composition has been applied or wherein an unfinished surface displays an eliminated or reduced distinguishing characteristic indicating where the composition has been applied after the unfinished surface has been finished.

28. The method of claim 27, wherein the distinguishing characteristic is a sheen.

29. The surfacing composition of claim 1, wherein the composition displays no sheen after finishing.

30. The surfacing composition of claim 1, wherein the composition is without observable characteristics that identify the location of the composition after finishing.

* * * * *